UNITED STATES PATENT OFFICE.

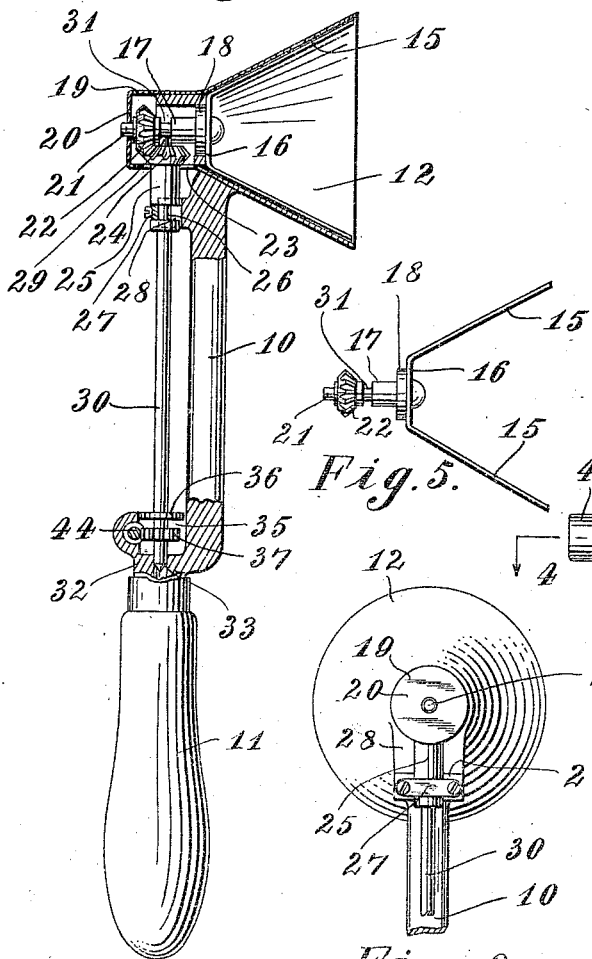

JOSEPH BLUHM, OF TROY, NEW YORK, ASSIGNOR, BY DIRECT AND MESNE ASSIGNMENTS, TO DANA MANUFACTURING CORPORATION, OF TROY, NEW YORK, A CORPORATION OF NEW YORK.

ICE-CREAM SCOOP.

1,296,745.　　　　　Specification of Letters Patent.　　Patented Mar. 11, 1919.

Application filed December 10, 1915, Serial No. 66,059. Renewed August 2, 1918. Serial No. 248,068.

*To all whom it may concern:*

Be it known that I, JOSEPH BLUHM, a citizen of the United States, and resident of Troy, in the county of Rensselaer and State of New York, have invented certain new and useful Improvements in Ice-Cream Scoops, of which the following is a specification.

This invention relates to improvements in devices for scooping, conveying and delivering uniform quantities of plastic substances, with special reference to the product known as ice-cream, and has for its objects:—

First, the provision of a utensil that may be conveniently operated by one hand only, when dipping and dispensing, the other hand being free for other purposes.

Second, to provide a "straight line" operating mechanism, convenient to use and in which all the parts may be disassociated if required.

These and other objects are attained by the novel construction and arrangement of parts hereafter described and shown in the accompanying drawing, forming a material part of this disclosure, and in which:—

Figure 1 is a top plan view of a scoop made in accordance with the invention.

Fig. 2 is a partial side and sectional view of the same.

Fig. 3 is a fragmental bottom plan view of the scoop.

Fig. 4 is a transverse sectional view taken on line 4—4 of Fig. 1, and

Fig. 5 is a side view of the scraper and driving gear.

The invention includes a frame 10 having a plain handle 11 at one end and connected rigidly with a conical scoop 12 at the other.

Within the scoop are a pair of scraper arms 15 integrally connected by the bridge 16, the arms being bent and disposed to sweep the interior surface of the scoop as they are rotated in it.

The bridge 16 is secured to a stem 17, having an annular flange 18 fitted to an opening formed in the cylindrical extension 19, of the scoop at its smallest diameter, the extension being formed with an integral cover 20 having a central opening to receive the pintle 21 of the stem 17, the pintle and flange 18 acting as trunnions for the stem and scraper.

Secured on the stem 17 is a bevel pinion 22 driven by the mating pinion 24 which passes into the cylinder 19 through an opening 23 registering with the handle 11.

A long hub 25 is formed with the pinion 24 and in it is an annular groove 26 suited to receive a strap 27 or its equivalent, the latter being secured at its ends to lugs 28 formed with the frame 10 at its lower side.

A rod 30 is secured in the hub 25, having its projecting end 29 extend through the pinion and engage in an annular recess 31 formed in the stem 17, whereby the latter is held from rising when the parts are assembled; extending below and parallel to the frame 10, into the offset portion 32, to which the handle is connected, and has a bearing 33 therein in which it may rotate.

This bearing is counterbored as at 35, receptive of the disk 36, which acts as a cover to it, the disk being secured to the rod 30; also on the rod is a spur pinion 37 by which the rod is rotated. With the offset portion 32 is integrally formed a transverse cylindrical element, one end 40 of which extends laterally out and is bored to receive a coiled push spring 41, the outer end of which abuts against the restraining cap 42, while the other end exerts its tension against the end of a rod 44 and is limited in extent of movement by the shoulder 43 at the end of the counterbore.

The rod 44 is freely slidable in the opposite end of the cylindrical extension 45, through which it passes and is furnished with the button head or knob 46 upon which the finger can be pressed in operating it.

This rod is formed with a plurality of annular grooves 48, evenly spaced and uniform in all respects, the rings 49 remaining between the grooves engaging with the pinion 30 and transmitting motion to it as the knob 46 is actuated.

Thus if the plunger rod be operated in either direction, by pressing or releasing the knob 46 it will transmit motion to the pinion and by reason of the extended area of ring contact the plunger is substantially unaffected by wear.

In operation, the scoop is dipped as usual, inverted at the place it is desired to dispense the contents, and the knob 46 pushed inwardly; this causes the scraper arm to rotate within the scoop, freeing the content so it will drop out.

When pressure is released the spring returns the parts to place.

If it be desired to dismount the scrapers, the strip 27 is removed, allowing the rod and its attached parts to move toward the handle sufficiently to not only disengage, but retract the pinion 24 so that the pinion 22 will pass freely by its end.

When the strip is in place the rod is held locked in proper position to cause the gears to mesh correctly.

The utensil may be readily cleansed in a thorough manner after use and it is amenable to sterilization by heat treatment or otherwise without any injurious effect to its parts.

Having thus described my invention and set forth its construction and novel characteristics, what I claim as new and desire to secure by Letters Patent is:—

In a scoop, a conical cup, a pair of integrally connected scraper arms operable therein, a stem engaged with said arms, said stem being revolubly mounted at the apex of said cup, a bevel pinion on said stem, a rod revolubly mounted transversely to said stem, a bevel pinion engageable with the first named pinion, removable means for normally maintaining said pinions in engagement, a spur pinion on said rod, a plunger having rings upon its periphery engageable with said spur pinion, said plunger being operable in a straight line, a housing for said plunger and a spring in said housing for returning said plunger to its initial position.

Signed at Troy, in the county of Rensselaer and State of New York, this 18th day of November, A. D. 1915.

JOE BLUHM.

Witness:
JAMES GEIER.

Copies of this patent may be obtained for five cents each, by addressing the "Commissioner of Patents, Washington, D. C."